(12) United States Patent
Cummings et al.

(10) Patent No.: US 6,869,015 B2
(45) Date of Patent: Mar. 22, 2005

(54) TAMPER-INDICATING BARCODE AND METHOD

(75) Inventors: Eric B. Cummings, Livermore, CA (US); William R. Even, Jr., Livermore, CA (US); Blake A. Simmons, Oakland, CA (US); Paul Michael Dentinger, Sunol, CA (US)

(73) Assignee: Sandia National Laboratories, Livermore, CA (US)

( * ) Notice: Subject to any disclaimer, the term of this patent is extended or adjusted under 35 U.S.C. 154(b) by 2 days.

(21) Appl. No.: 10/265,477

(22) Filed: Oct. 4, 2002

(65) Prior Publication Data

US 2003/0098357 A1 May 29, 2003

Related U.S. Application Data

(63) Continuation-in-part of application No. 09/870,391, filed on May 30, 2001.

(51) Int. Cl.[7] ............................................... G08K 9/22
(52) U.S. Cl. ......................... 235/462.25; 235/462.01; 235/462.1; 235/462.11; 235/462.16; 235/462.25
(58) Field of Search ......................... 235/462.01, 462.1, 235/462.11, 462.16, 462.25, 462.24

(56) References Cited

U.S. PATENT DOCUMENTS

| | | | |
|---|---|---|---|
| 4,435,835 A | | 3/1984 | Sakow et al. |
| 4,948,955 A | | 8/1990 | Lee et al. |
| 5,084,143 A | * | 1/1992 | Smith ........................ 205/112 |
| 5,091,966 A | | 2/1992 | Bloomberg et al. |
| 5,128,525 A | | 7/1992 | Stearns et al. |
| 5,521,368 A | | 5/1996 | Adachi |
| 5,605,738 A | * | 2/1997 | McGinness et al. ...... 428/195.1 |
| 5,621,864 A | * | 4/1997 | Benade et al. ............. 358/1.18 |
| 5,660,925 A | * | 8/1997 | Cooley et al. ........... 428/304.4 |
| 5,835,639 A | | 11/1998 | Honsinger et al. |
| 5,862,270 A | | 1/1999 | Lopresti et al. |
| 5,895,075 A | * | 4/1999 | Edwards ...................... 283/81 |
| 5,940,135 A | | 8/1999 | Petrovic et al. |
| 5,974,200 A | | 10/1999 | Zhou et al. |
| 6,082,619 A | | 7/2000 | Ma et al. |
| 6,115,508 A | | 9/2000 | Lopresti et al. |
| 6,164,548 A | * | 12/2000 | Curiel ........................ 235/487 |

OTHER PUBLICATIONS

Javidi (1997), "Securing Information with Optical Technologies," *Physics Today* 50:27–32.

Javidi et al. (1996), "Experimental Demonstration of the Random Phase Encoding Technique for Image Encryption and Security Verification," *Opt. Eng.* 35(9):2506–2512.

Javidi et al. (1998), "Performance of Double Phase Encoding Encryption Technique Using Binarized Encrypted Images," *Opt. Eng.* 37(2):565–569.

Nomura et al. (2000), "Optical Encryption Using a Joint Transform Correlator Architecture," *Opt. Eng.* 39:2031–2035.

Refregier et al. (1995), "Optical Image Encryption Based on Input Plane and Fourier Plane Random Encoding," *Opt. Lett.* 20(7):767–769.

(List continued on next page.)

*Primary Examiner*—Michael G. Lee
*Assistant Examiner*—Ahshik Kim
(74) *Attorney, Agent, or Firm*—Reed Intellectual Property Law Group

(57) ABSTRACT

A novel tamper-indicating barcode methodology is disclosed that allows for detection of alteration to the barcode. The tamper-indicating methodology makes use of a tamper-indicating means that may be comprised of a particulate indicator, an optical indicator, a deformable substrate, and/or may be an integrated aspect of the barcode itself. This tamper-indicating information provides greater security for the contents of containers sealed with the tamper-indicating barcodes.

28 Claims, 20 Drawing Sheets

OTHER PUBLICATIONS

Unnikrishnan et al. (2000), "Double Random Fractional Fourier–Domain Encoding for Optical Security," *Opt. Eng.* 39:2853–2859.

Yamazaki et al. (2001), "Optimization of Encrypted Holograms in Optical Security Systems," *Opt. Eng.* 40(1):132–137.

Yang et al. (1996), "Practical Image Encryption Scheme by Real–Valued Data," *Opt. Eng.* 35(9):2473–2478.

* cited by examiner

Initial t = 5 months

TAMPER-INDICATING BARCODE AND METHOD

RELATED APPLICATIONS

This application is a continuation-in-part of U.S. patent application Ser. No. 09/870,391, filed May 30, 2001, the disclosure of which is incorporated herein by reference in full.

STATEMENT OF GOVERNMENT INTEREST

The United States Government has certain rights in this invention pursuant to Contract No. DE-AC04-94AL85000 between the United States Department of Energy and the Sandia Corporation for the operation of the Sandia National Laboratory.

TECHNICAL FIELD

This invention relates generally to tamper-indicating barcodes, and, more particularly, to a tamper-indicating spread-spectrum barcode that allows for increased security and fidelity while permitting the barcode to be read in its entirety even if a significant fraction or majority of the barcode is obscured.

BACKGROUND

One-dimensional barcodes are widely used as optically readable means to store information. Within the past decade, two-dimensional barcodes have emerged to facilitate denser storage of data (see, for example, U.S. Pat. No. 5,128,525 to Stems et al., U.S. Pat. No. 5,940,135 to Petrovic et al., and U.S. Pat. Nos. 5,862,270 and 6,115,508 to Lopresti et al.). Commonly used formats for two-dimensional data encoding include, "Aztec Code," "Data Matrix," "Data Strip Code," "MaxiCode," "PDF 417," "Micro-PDF 417,"and "QR Code." Each of these conventional formats localizes data in characters or "glyphs" that are designed to facilitate machine reading.

Tamper evident seals and tags have been used for centuries, perhaps millennia, to secure and protect valuable information and articles. Currently, modern versions of these seals are used to secure some of the most dangerous articles created by mankind. The development of the "modern" tags and seals largely stopped in the 1970's, when the technology was deemed "mature" and unbreakable. Thirty years of technological innovations in printing, reproduction, computers, and robotics later, experts raise serious concerns about the security of these tags. Research into ultra-secure tags and seals has continued at a low level in the intervening years. Several promising technologies, e.g., glitter and fiber-optic tags have been developed that appear to be supremely difficult to counterfeit with no detectable differences. The trouble with these technologies is that the tamper evaluation requires sophisticated and time-consuming arrangement of evaluation apparatus, rendering the tags and seals inapplicable for use with walk-through inspections.

There is, therefore, a need in the art for tamper-indicating barcodes that provide a reliable and efficient way to determine if a barcode has been subjected to subtle or sophisticated tampering. Given the advances in copier and printing technologies, manipulation, alteration, and counterfeiting have become ever-present threats to the security of barcode-formatted data. The present invention relates to a novel tamper-indicating barcode that allows for detection of alteration to the barcode.

SUMMARY OF THE INVENTION

It is therefore an object of the invention to provide a tamper-indicating barcode, comprising a barcode component having at least one tamper-indicating means attached thereto, wherein the tamper-indicating means has pre-determined characteristics. The barcode component may be any conventionally known barcode. Preferred barcode components are spread-spectrum barcodes. The tamper-indicating means may take the form of a fiducial signature that is incorporated into the barcode itself or may be a particulate indicator, an optical indicator, a deformable substrate, or a combination of any of the aforementioned.

It is an additional object of the invention to provide a method for ascertaining if a barcode has been tampered with, comprising the steps of (a) providing a tamper-indicating barcode as described above, (b) examining the barcode to determine the current characteristics of the tamper-indicating means, and (c) comparing the current characteristics with the pre-determined characteristics to ascertain if the barcode has been tampered with.

Additional objects, advantages, and novel features of the invention will be set forth in part in the description that follows, and in part will become apparent to those skilled in the art upon examination of the following, or may be learned by practice of the invention.

BRIEF DESCRIPTION OF THE DRAWINGS

FIG. 28A shows the barcode after fabrication and FIG. 28B shows the same barcode after storage for 5 months.

DETAILED DESCRIPTION OF THE INVENTION

I. Definitions

Figure 1:
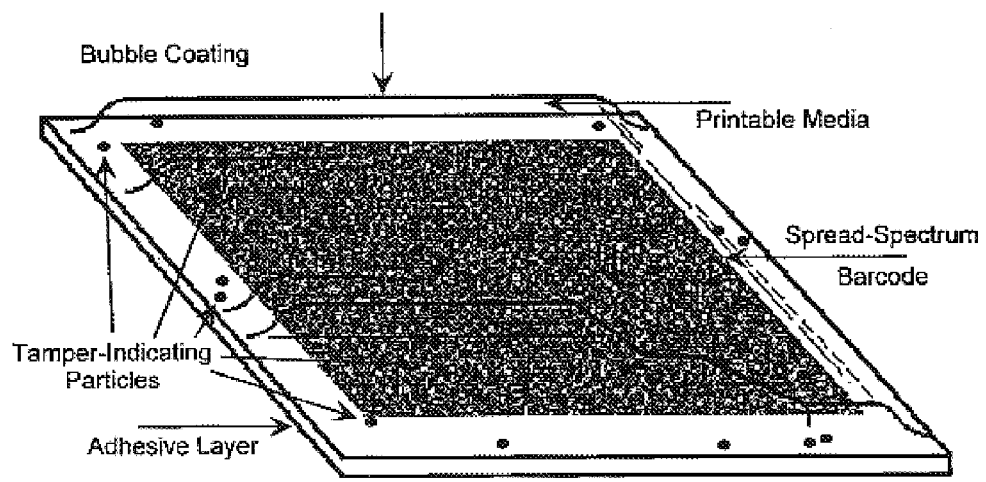
FIG. 1 is a depiction of a tamper-indicating barcode of the invention.

Before describing the present invention in detail, it is to be understood that this invention is not limited to specific encoding schemes, modulation kernels, printing methods, or materials, as such may vary. It is also to be understood that the terminology used herein is for the purpose of describing particular embodiments only, and is not intended to be limiting.

It must be noted that, as used in this specification and the appended claims, the singular forms "a," "an," and "the" include plural referents unless the context clearly dictates otherwise. Thus, for example, reference to a "glyph" includes both multiple and single glyphs.

In describing and claiming the present invention, the following terminology will be used in accordance with the definitions set out below.

The expressions "encoded user data array" and "user data array" refer to a spatially encoded array of user data and are used interchangeably.

The term "modulating kernel" refers to a pseudo-random carrier.

The term "signature fiduciary" refers to the registration information embedded in the barcode that is used to correct the scanned image.

The term "signature texture" refers to the aspect of the signature fiduciary that allows for correction and detection of distortions caused by tampering, rotation, tilt, perspective, curvature, and warp.

The term "signature pattern" refers to the aspect of the signature fiduciary that allows for translational registration of individual subsections that have been corrected using transforms constructed from the signature texture.

While the invention is set out in detail below with specific reference to certain embodiments, it is to be understood that there is no intent to limit the invention to the specific embodiments discussed. The intent is rather to cover all alternatives, modifications, and equivalents falling within the spirit and scope of the invention as defined by the appended claims.

II. The Tamper-Indicating Barcode

The tamper-indicating barcode of the invention is comprised of a barcode component and at least one tamper-indicating means attached thereto. The barcode component may be any conventionally used barcode, such as, but not limited to, one dimensional barcodes, e.g., UPC, EAN, JAN, UPC 128, and two dimensional barcodes, e.g., Aztec Code, Data Matrix, Data Strip Code, MaxiCode, PDF 417, Micro-PDF 417, and QR Code, all of which are readable by a variety of bar code reading devices. Alternatively, the barcode component may be a spread-spectrum barcode, as discussed in the commonly assigned, copending U.S. patent application Ser. No. 09/870,391, filed May 30, 2001, the disclosure of which is incorporated herein by reference in full. Specific aspects and advantages of the spread-spectrum barcode will be discussed more fully below.

The tamper-indicating means may be an integrated component of the data encoded into the barcode component or may take the form of a particulate indicator, an optical indicator, a deformable substrate, or a combination thereof.

Particulate Indicators

Particulate indicators may be comprised of particles ranging in size from approximately 2 nm to approximately 5 mm, with sizes ranging from approximately 10 nm to approximately 500 µm being preferred. The particles may be of any desired shape and may be optically active, magnetic, luminescent, or fluorescent, thereby enabling a wide range of detection methods. A combination of particles may be used to enhance the ability of the particulate indicating means to detect attempts at counterfeiting. Suitable particles include, but are not limited to, metal oxides, inorganic oxides, metals, polymeric materials, and the like.

The particulate indicator may take a variety of forms. In one embodiment, the particulate indicator is comprised of particles that are printed onto or with the barcode component. The particles may be incorporated into a liquid carrier, such as ink, and then printed onto or with the barcode component. By placing these particles within the ink used to form the barcode component, the position of the particles can be controlled via computer control of the device used during the transfer of the barcode component to a recording medium. This embodiment allows for quick screening for tampering by looking for the particles at the specific location at which they were placed (e.g., a pre-determined characteristic). The particles used in this embodiment are preferably amenable to the specific delivery mechanism employed to place these particles at their desired location (i.e. the correct size and chemical profiles). A typical example of this process is shown in FIG. 1.

For example, a preferred embodiment for this part of the current invention utilizes ytterbium-yttrium-erbium oxide nanoparticles that emit visible light when excited by 980 nm IR light. These nanoparticles are suspended in the ink that is to be used in the inkjet printer, which is then placed in the inkjet cartridge using a refill kit apparatus. The inkjet cartridge is then placed in the inkjet printer and operated normally. These nanoparticle inks may be utilized in either a black or color cartridge. Thus, these nanoparticles may be randomly integrated in the barcode printout by using just the black inkjet cartridge, or by using any one or any combination of inkjet cartridges during printing.

In another embodiment, the particulate indicator may be in the form of a particulate-containing coating or gel. The use of such a coating or gel allows for the random and unique dispersion of particles that can be monitored with a decoding software package. Suitable coatings include, but are not limited to, polymeric materials such as polyethylene, polypropylene, polystyrene, glassine, or other flexible packaging films.

Particulate-containing gels may also be used as the tamper-indicating means. The gels stabilize and retain the particles in a specific location (e.g., a pre-determined characteristic) so that the location of the particles can be tracked and monitored. Any attempt to physically remove or alter the barcode component results in alteration of the location of the particles within the gel. This shift in particle position indicates that the security and the integrity of the barcode component has been compromised. As discussed above, the particles can be identified by their size, shape, optical activity, magnetic properties, luminescence, and/or fluorescence to cover a wide range of overt/covert detection methods. Any of these aforementioned identifiers can be used to ascertain the pre-determined characteristics. In addition to allowing the detection of physical tampering, the particles and/or gels could be modified so that they would be sensitive to changes in the surrounding environment of the tag. This would permit the monitoring of additional stimuli that the tag may be exposed to during its operational lifetime. These modifications may include elements that would undergo a permanent color change when exposed to extreme variations in temperature, relative humidity indicators, chemical reaction indicators, and field responsive elements (paramagnetic elements and/or radiation sensitive elements).

Suitable gels are typically rigid media having a shear viscosity of at least $10^5$ cP at 23° C., preferably having a shear viscosity of at least 50 Pa, and that undergo a discrete phase change from a liquid to a gel at a specific temperature in a predictable fashion. This phase change may occur at temperatures greater and/or lower than room temperature. The gel is preferably transparent while in the gel phase, with a low refractive index. This is necessary so that the decoding software can successfully read the barcode component. The gel must also be able to withstand variations in relative humidity and temperature. Suitable gel materials include, but are not limited to, polymeric, small molecule gelator complexes, and those materials having chemical bonding between molecules of a covalent or ionic nature, and/or physically interconnected supramolecular networks. Examples of suitable gels include, but are not limited to, polyvinyl chloride gels, polyhydroxyethylmethacrylate hydrogels, polystyrene organogels, poly-NIPA hydrogels, agarose gels, acetate gels, and polyacrylamide gels. Other suitable gels will be known to those of skill in the art.

Additionally, these gel-based particulate indicators also possess a randomized "reset" element. By inducing a phase change, or an intentionally applied force (i.e. roller), the particles will move into a new alignment that is completely random in nature. This would allow for the tamper-indicating monitoring to be based on a chosen continuous, random, and unique particle signature that is obtained when desired (either at the beginning of barcode application and/or after a designated time interval).

In yet another embodiment of the invention, the particles of the particulate indicator are located in an adhesive that is used to attach the tamper-indicating barcode to the intended substrate. In this embodiment, the adhesive is preferably transparent or of sufficiently low opacity to allow for detection of the particles within the adhesive. As will be appreciated, in order for the particles located within the adhesive to be visible, a portion of the adhesive must extend beyond the area covered by opaque areas of the barcode component. Alternatively, if the adhesive area cannot be extended beyond the area covered by the barcode component, particles that are detectable by non-visual means, e.g., X-ray detectable metal particles, etc., may be used.

It is to be understood that multiple tamper-indicating means may be used in a single tamper-indicating barcode. For example, multiple particulate indicators may be used with particles of the same or different materials; the particles may be present in the ink with which the barcode component is printed, in a gel-containing pouch that overlays the barcode, and/or in an adhesive used to attach the barcode to the desired substrate.

Optical Indicators

In another embodiment of the invention, the tamper-indicating means comprises an optical indicator. Such indicators generally take the form of holographic materials, prismatic materials, geometric materials, refractive materials, polarizing materials, and combinations thereof. The optical indicator enables the detection of tampering via alteration in the optical characteristics of the optical indicator or of the barcode component when viewed through the optical indicator.

Generally the optical indicator will take the form of a layer or film that covers all or portions of the barcode component. Optical characteristics of the resulting tamper-indicating barcode are then recorded for later reference. The recorded characteristics may take the form of an image of the barcode when viewed from specific angles, an image of features contained within the optical indicator itself, e.g., images in a holographic indicator, patterns in geometric or refractive indicators, and the like.

In embodiments wherein the optical indicator only covers a portion of the barcode component, the location of the optical indicator may also serve as a tamper-indicating means. The optical indicator may be printed directly onto the barcode. Such printed optical indicators provide a simple and cost effective method of authentication. Suitable printable optical indicators include, but are not limited to, refractive dots, disks, and lines, etc., having a high refractive index. Generally, the refractive index of the material used to print the optical indicator will range from approximately 1 to approximately 2, preferably ranging from approximately 1.3 to approximately 1.8, with indexes ranging from approximately 1.5 to approximately 1.7 being most preferred. The printed optical indicators are preferably printed using a transparent or translucent polymeric liquid. Suitable liquids and inks will be known to those of skill in the art and include, but are not limited to, polyacrylates and the like.

Deformable Substrates

In yet another embodiment of the invention, the tamper-indicating means takes the form of a deformable substrate upon which or into which the barcode component is transferred. The barcode component and deformable substrate are then affixed to the substrate that is to be marked with the tamper-indicating barcode. The deformable substrate enables the detection of tampering, as attempts to alter or modify the barcode component will result in detectable damage to the deformable substrate.

Suitable deformable substrates include flexible films, which may be transparent or opaque (for example, cellophane). Other materials that may be used as the deformable substrate include, but are not limited to, various polymeric materials such as, for example, polyethylene, polypropylene, polystyrene, glassine, saran wrap, or other flexible packaging films, or paper. A wrapper film may comprise two or more plies of polymeric materials bonded together, or laminates with non-polymeric materials. It can also be a metallized or reinforced polymeric film, or reinforced paper. Other suitable deformable substrates include materials such as waxes or hardened polygels.

Spread-Spectrum Bar Codes and Integrated Tamper-Indicating Means

As discussed above, the barcode component may comprise a spread-spectrum barcode. This type of barcode is particularly suitable for use in tamper-indicating barcodes, as spread-spectrum barcodes allow for accurate data retrieval even when up to approximately 80% of the barcode component is obscured.

In a spread spectrum barcode, user data is modulated in a distributed fashion across a data bearing barcode image so that each pixel of image, on average, contains an equal fraction of all the encoded information. Spatial averaging of this information is required to obtain a signal to noise ratio (SNR) high enough for decoding the information. Thus, user data is recoverable provided enough of the barcode is visible to obtain a usable SNR.

In one type of spread-spectrum barcode, each bit or cluster of bits of the user data is permutated and repeated at a long (e.g., greater than sixteen) sequence of locations within the image array. The permutation and location sequence can be derived algorithmically and from a pseudo-random code. This direct means of modulating the user data provides for creating a signature texture by appropriately crafting the permutation and location sequence. Moreover, appropriately pre-appending, interspersing, or appending bits to the user data can create the signature texture.

Figure 2A:
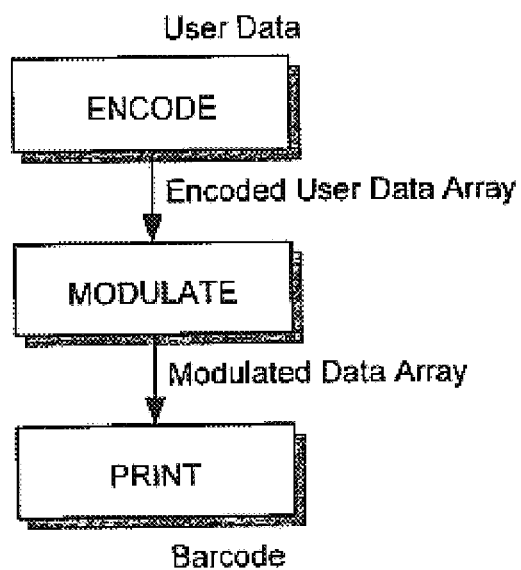
FIGS. 2A and B are block diagrams showing a method of using a spread-spectrum barcode suitable for use in the invention.
Figure 2B:
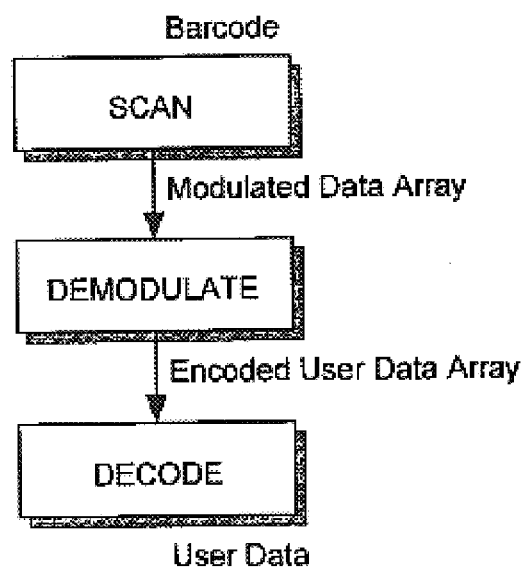

In an alternate version of a spread-spectrum barcode, a direct-sequence, spread-spectrum modulation technique is used to distribute the information. This technique is implemented by convolving a pseudo-random "modulation kernel" $K_m$ with a discrete spatial encoding of user data (similar to a conventional two-dimensional barcode). In this version, convolving the resulting spread-spectrum barcode image with a kernel related to the kernel used in the modulation will demodulate the spatially encoded data. User data is then decoded from the spatial representation using standard techniques. A diagram of the method of the invention is presented in FIGS. 2A and B.

Figure 3A:
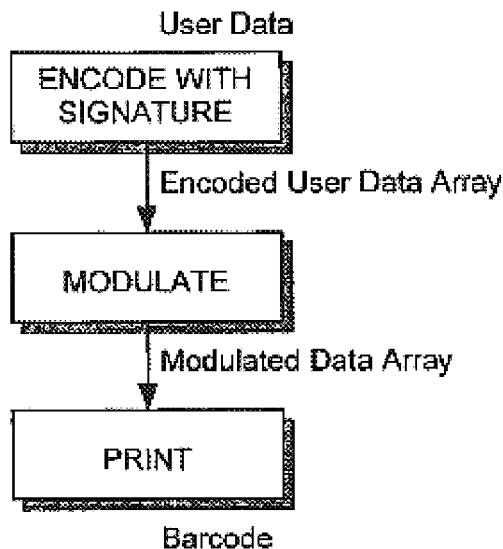
FIGS. 3A and B are block diagrams showing an embodiment of the claimed method wherein signature data are crafted into the encoded user data.
Figure 3B:
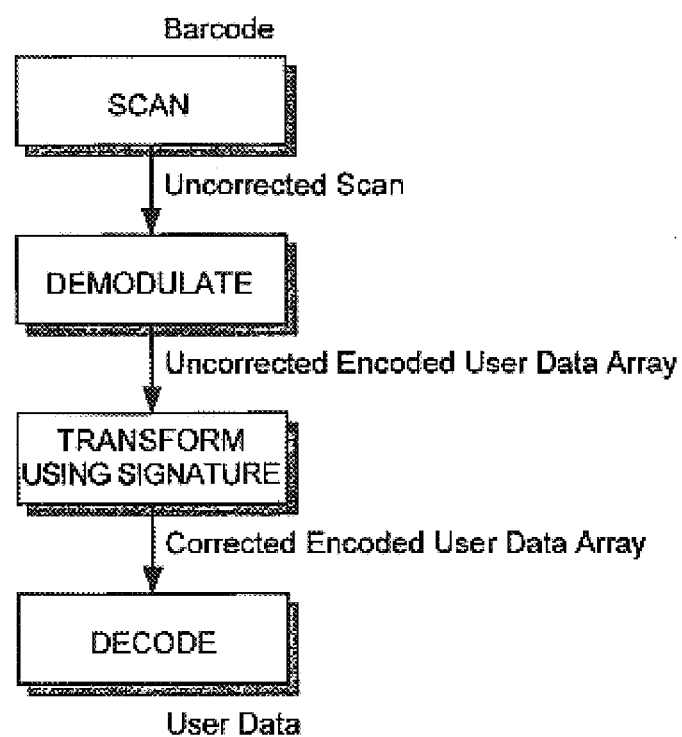

In spread-spectrum barcodes, fiducial data are modulated in a distributed fashion across a barcode image so that each pixel of image, on average, contains an equal fraction of fiducial information. These distributed fiduciaries facilitate image registration (the precise determination of the position and arrangement of the barcode image), an integral step of the demodulation procedure that is poorly accommodated using current registration methods. In a preferred embodiment of the distributed fiduciary, the barcode reader recognizes two signature characteristics of the barcode image: a signature "texture" and a signature "pattern." These signatures are known by the barcode reader and are present regardless of the contents of user data sets contained in the barcode. A diagram wherein registration information has been incorporated in the barcode image is presented in FIGS. 3A and B.

The signature texture contains cues to the local tilt, perspective, and magnification of the barcode image. In a preferred embodiment, this texture is quantified by two-dimensional autocorrelation of subimages of the full barcode image, which can be performed rapidly by the use of fast Fourier transforms. The location of the features (e.g., peaks and dips) used in the autocorrelation provides measurements of tilt, zoom, and perspective of the subimage. These local measurements are then used to infer high-order image defects like warping and curvature. The relative intensity of peaks and dips in this correlation also allows non-uniform illumination to be normalized. The signature texture thus facilitates the measurement of all imaging defects except translation and a 180-degree ambiguity in rotation angle. When the spread-spectrum barcode is used with a deformable substrate as a tamper-indicating means, defects such as warp and curvature are indicators of tampering.

The signature pattern facilitates the measurement of image translation and resolution of the rotational ambiguity. In a preferred embodiment, the location of each subimage with respect to a known pattern is obtained by correcting each subimage (e.g., bilinearly) for magnification, tilt, perspective, and rotation, based upon the texture measurements. This corrected subimage is then cross-correlated with the known pattern. If the angular ambiguity has not been resolved by other means, e.g., continuity of the barcode image, the corrected subimage is then rotated 180 degrees and cross-correlated with the known pattern. The properly orientated subimage has the highest cross-correlation peak. The location of the peak correlation provides the relative translation of the subimage with respect to the known pattern. The corrected subimages are then combined in the proper location into a complete registered version of the image.

If needed, the image registration can be more elaborate and iterative. For example, parameters of a spline or other mathematical representation of the barcode surface can be initially estimated using this methodology and then refined iteratively by maximizing the correlation coefficient of the barcode image and pattern. This computationally burdensome procedure may be useful in cases where it is critical to recover the data from a badly damaged or distorted barcode and when the simpler processing fails, or where other reasons exist for wanting a precision measurement of the barcoded surface, as will be discussed below.

The barcode can be given signature texture and patterns by a range of means, including:

1. superimposing an image having the desired texture, pattern, or both on the data-bearing barcode image, or
2. encoding the user data in a special form that imparts a close approximation of the desired texture, pattern, or both on the barcode image regardless of the actual user data.

Any combination of these techniques can be employed to produce the signatures. For example, a "texture signature" and a "pattern signature" can be independently superimposed on the data-bearing barcode. Such patterns and signatures may also comprise the tamper-indicating means, as alteration of a spread-spectrum barcode component will be reflected in the signature texture and/or pattern.

Figure 4A:
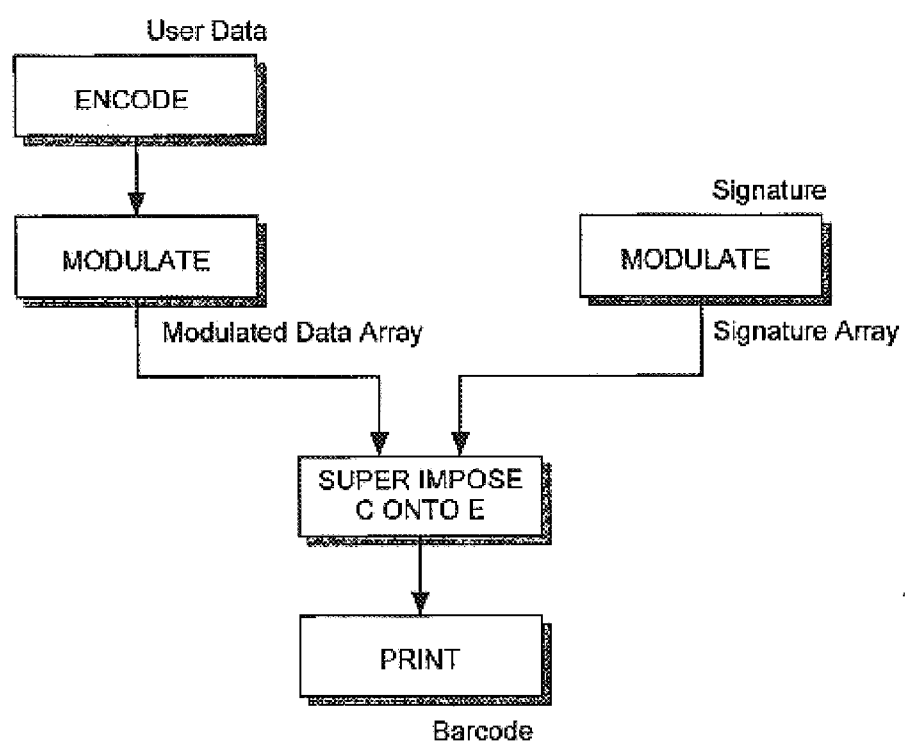
FIGS. 4A and B are block diagrams showing an embodiment of the claimed method wherein signature data are superimposed on the user data.
Figure 4B:
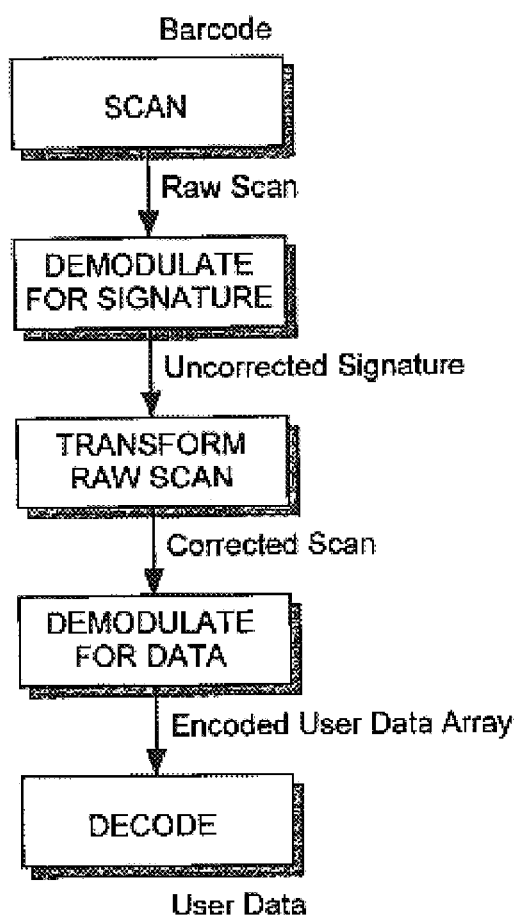

A preferred embodiment shown in FIGS. 4A and B uses the superimposition of a combination "texture/pattern signature" on a general data-bearing barcode. This embodiment has the advantage of allowing virtually any data encoding scheme to be used, while avoiding the additive loss in user data capacity caused by superimposing two independent carriers.

An alternative preferred embodiment is the use of a specific encoding methodology to ensure that the signature texture is approximated, regardless of the contents of the user data. The data-bearing image is then superimposed with a relatively weak pattern signature, thereby minimizing the loss in user data capacity. The principal disadvantages of this embodiment are that only special user data encoding methods can be employed and that the fidelity to the signature of the actual texture may depend on the contents of the user data. That is, an encoding methodology that produces a good match to the signature for random data may produce a poor match for highly ordered data (such as a long string of repeated characters). Fortunately, the actual and signature textures can be compared while the barcode is being generated, and corrective steps taken, including, but not limited to:

1. compressing the user data and thereby increasing the apparent data disorder and possibly increasing data capacity;
2. pre-encoding digitally the user data before the spatial encoding, to produce a better match to the signature texture. (This procedure will slightly reduce data capacity, since the method of pre-encoding will need to be indexed or otherwise indicated in the barcode data); and
3. pre-appending, appending, or interspersing non-user data within the user data to improve the match between the actual and signature texture, directly reducing user data capacity.

In another preferred embodiment, multiple sets of user data may be encoded on to the same barcode by superimposing a second set of user data that has been modulated with a different encoding kernel.

The steps of encoding and modulating the user data are not necessarily distinct, and these functions can be performed simultaneously. For example, as described earlier, data bits may be redundantly encoded at a pseudo-random sequence of locations within the image. However, a preferred embodiment of the spread-spectrum barcode utilizes a two-step procedure wherein the user data are first spatially encoded into an encoded data array, A, as a sequence of glyphs, and are then modulated to spread the encoded data redundantly across the barcode. Reading of the barcode proceeds by demodulation of the spread-modulated data, followed by decoding of the demodulated encoded data. An algorithm for data encoding and decoding is called a codec. This section describes preferred spatial codecs for encoding and decoding user data either with or without the inclusion of a signature texture and/or signature pattern.

Optimal codec selection is highly dependent upon the intended data detection or storage method. If the data are to be stored electronically, a codec that supports rapid automated processing, error correction, and error detection is desirable. If the data are simply to be viewed by a user, they could be encoded into a human readable format using a font. Data representing an image could be encoded verbatim and also decoded visually. Suitable codecs are well known in the art and would be readily apparent to one who is skilled in the art.

One example of a codec that facilitates electronic storage of the recovered data is as follows. Eight-bit words are utilized in the embodiment discussed below. It will be appreciated that this data type choice is for purposes of example only, and that other data types may be used. The methodology disclosed herein can be extended without substantial modification to data units of arbitrary size. The goal of the encoding procedure is to produce a glyph that unambiguously represents the data word, provides for error detection and correction, and, regardless of the data word, has the minimum deviation from a target autocorrelation. The target is defined either by the signature texture or the desired spatial spectrum of the autocorrelation, e.g., white noise, pink noise with a low-frequency cutoff, etc. Error detection and correction are required for reliable and secure data transmission, and the ability to correct for at least one or two bit errors is preferable. Minimization of deviation from the target autocorrelation insures that the encoded data produce minimal errors in the texture signature and that the decoding is relatively immune to interference.

Suitable glyphs can be constructed in a variety of ways. In one embodiment, codecs utilize glyphs constructed from a base representation of an eight-bit word or data unit. The base consists of a block of pixels that includes the eight bits of the word or data unit and eight additional bits for error detection and correction, and, possibly, spectrum homogenization. After the encoded and modulated barcode is demodulated, the base is reconstructed from a glyph and, if needed, error correction is applied to recover the data word. One type of base consists of a 4×4 array containing eight data bits and eight error-correction bits. No homogenization bits are included. Another embodiment uses a 3×3 array containing eight data bits and one parity bit. The 4×4 basis is shown diagrammatically in FIG. 5 as (a).

Glyphs are constructed from a base in a variety of ways depending on the method chosen to generate the signature texture and pattern. If the encoding method is not used to produce the signature, glyphs can be as simple as a single copy of the basis. The peak autocorrelation and spatial spectrum that result from such simple glyphs typically differ significantly for each character represented. These differences may cause data words to differ undesirably in response to interference encountered during decoding. Also, the average spatial spectrum of the simple glyph-encoded data appears in the spatial spectrum and thus, in the texture of the barcode. As a result, the texture of the barcode can be significantly affected by the contents of the user data, necessitating compensation by the superposition of a relatively strong texture signature with an accompanying loss in user data capacity.

Alternatively, and preferably, glyphs can be constructed from the base with repetition and permutation to broaden and homogenize the spectrum of each glyph. As mentioned above, a goal of homogenization is to produce a pattern for all characters that has a minimum deviation from the target autocorrelation. The optimization of this construction is a therefore two-dimensional extension of the classical optimal coding problem. Optimization can be performed by computerized search or optimal coding theory (c.f., Golay codes). Although non-optimal, an alternative approach that represents a significant improvement over a simple copy of the base is the formation of a superbase composed of a copy of the base in one corner, a copy of the base with alternating rows of bits inverted in another corner, a copy of the base with alternating columns of bits inverted in another corner, and a copy of the base with alternating rows and columns of bits inverted in the remaining corner. An example of such a superbase using the 4×4 base of (a) in FIG. 5 is shown in FIG. 5 as (b).

Figure 5:
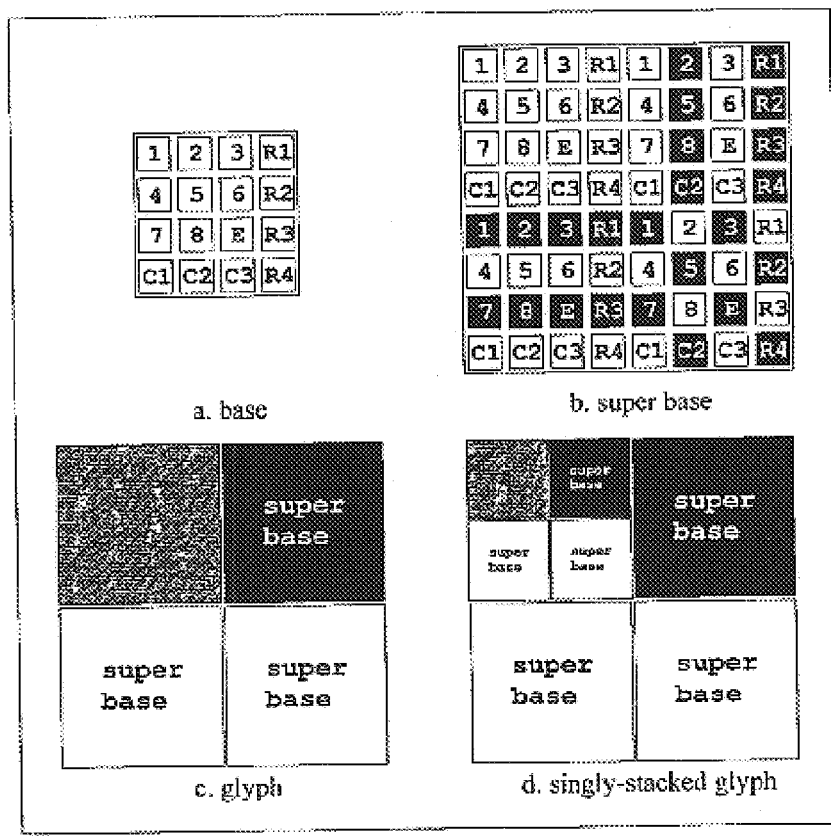
FIG. 5 shows diagrams of sample encoding methodology. In the base (a), blocks labeled with numbers represent data bits; blocks R1–R4 and C1–C3 are, respectively, row-wise and column-wise parity bits, and block E the parity of the data byte. In the superbase (b), black blocks represent inverted bits. The superbase consists of four permutated copies of the base. The glyph (c) consists of two positive copies of the superbase and a negative (inverted) copy. This arrangement produces the signature texture. Glyphs can be scaled and stacked (d) to spread the spatial spectrum of the data further.

In a preferred embodiment, wherein the signature texture is generated by the encoding method, the superbase discussed above is repeated in a 2×2 pattern (as shown in FIG. 5 as (c)) wherein each copy of the superbase is multiplied by a coefficient. These coefficients form a 2×2 matrix. Preferred matrices are (1) and (2) below:

$$\begin{bmatrix} -1 & -1 \\ 1 & 1 \end{bmatrix}, \text{and} \quad (1)$$

$$\begin{bmatrix} 0 & -1 \\ 1 & 1 \end{bmatrix}. \quad (2)$$

Glyphs constructed from either matrix (1) or matrix (2) contain a signature pattern comprised of an autocorrelation peak in the row-wise direction at a distance equal to the superbasis width, and a dip in the column-wise direction at a distance equal to the superbase height. These glyphs thus produce a useful pattern for registration purposes and have a useful texture by construction.

Figure 6:
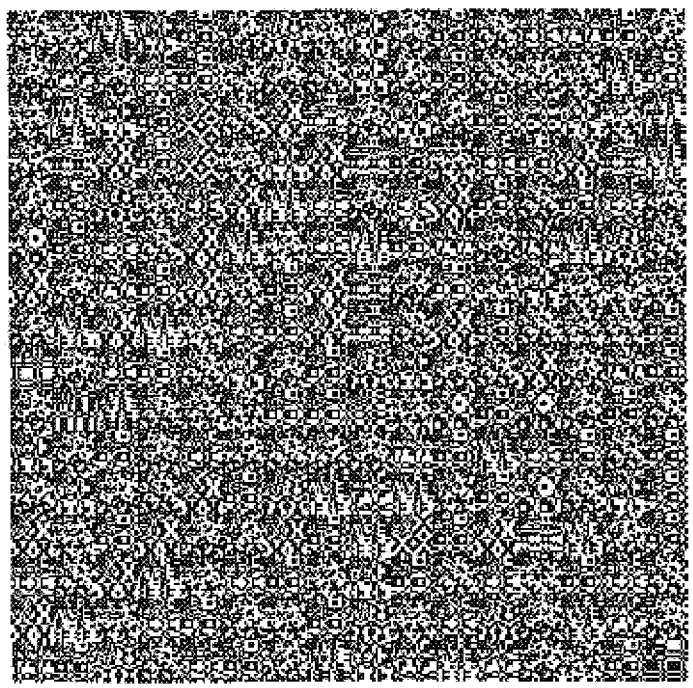
FIG. 6 shows the first 256 bytes of Lincoln's Gettysburg address encoded using singly stacked glyphs.

Glyphs constructed using matrix (2) can be binarily scaled and stacked without overlap when it is desired to spread the spectrum of the encoded data to higher or lower frequencies. An example of stacking appears in FIG. 5 as (d). The resulting spectrum has an approximate pink noise frequency roll off above the size of the largest glyph in the stack. FIG. 6 shows a sample message encoded using singly stacked glyphs.

To decode glyphs that are encoded as described above, grayscale measurements of the superbases are recovered from the measured glyphs, and grayscale measurements of the bases are obtained from the superbases. Bits of the base are recovered by thresholding the grayscales. Error correction is applied to these bits. If the error correction is indeterminate (for example, if multiple irresolvable bit errors exist) the deviation of the grayscale base values from the threshold can be used to assess which bits are the most likely to be invalid.

Figure 7:
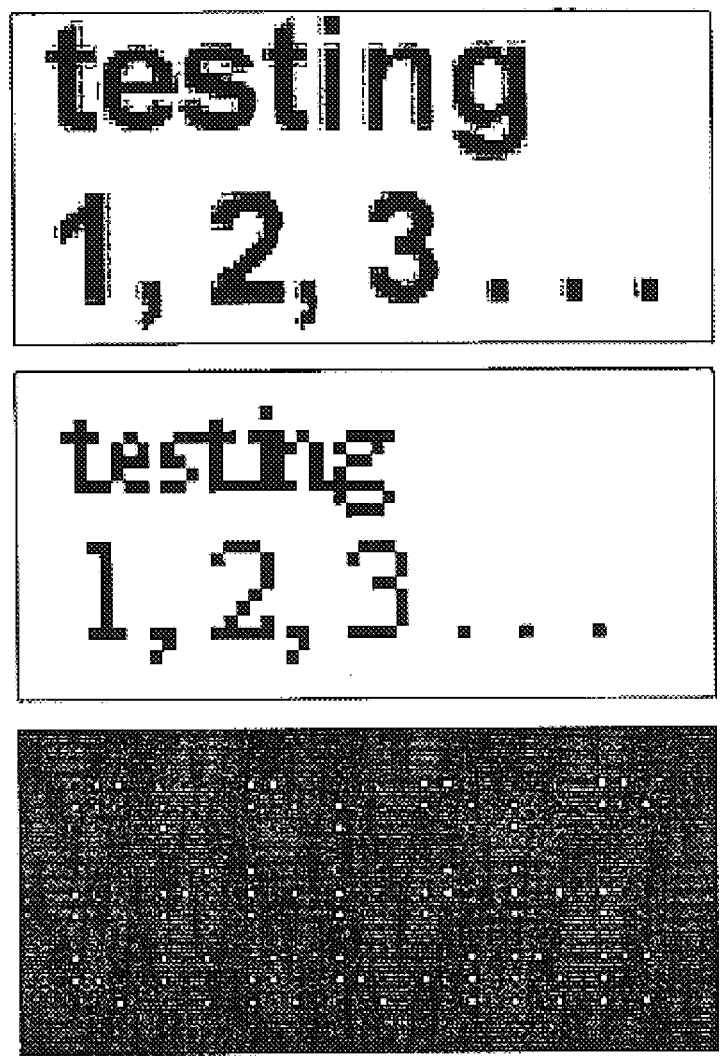
FIG. 7 shows three different conventional localized modulations of the data, "testing 1, 2, 3 . . . "
Figure 8:
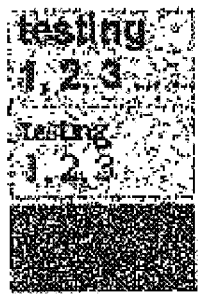
FIG. 8 illustrates how Gaussian noise superimposed on the modulations presented in FIG. 5 degrades the recovery of the data. The top encoding, being the most redundant, degrades the least. The center modulation is barely readable. The bottom modulation is not readable at all.
Figure 9:
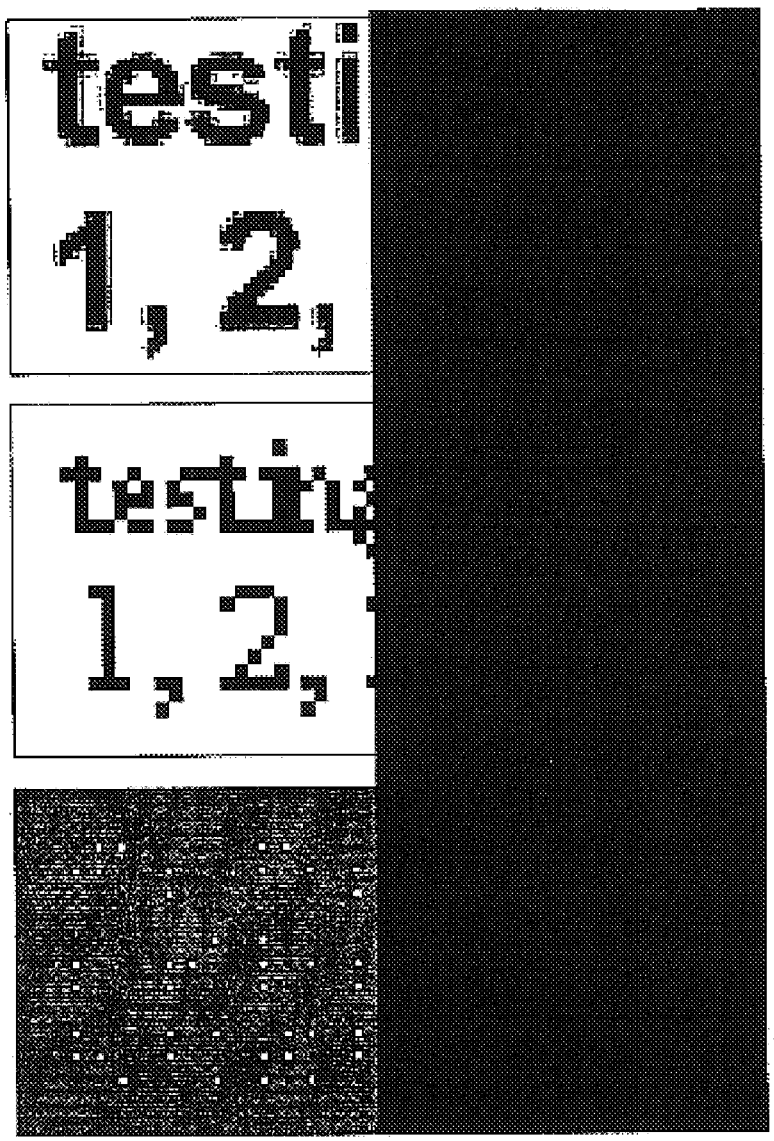
FIG. 9 shows how occlusion of the modulations presented in FIG. 5 renders the data unrecoverable because of data localization.

Normally, barcodes are constructed so that a bit of information is localized to one or a few discrete locations within A; or, several bits are grouped into a glyph that spans a limited range within A, as discussed above. FIG. 7 shows three "conventional" ways of invertibly encoding and placing the data "testing 1, 2, 3 . . . " in an array. The top and middle methods use recognizable glyphs. The top method uses more pixels and levels of gray to represent the data than does the middle encoding method, while the method utilized in the bottom of FIG. 7 represents each bit of a byte by a dark or light pixel against a gray background, with each byte arranged in a 3×3 base. In the third method, a parity bit is also included for single-bit error detection. A wide variety of alternative encoding methods is available, e.g., the encoding just described, Aztec Code, Data Matrix, Data Strip Code, MaxiCode, PDF 417, Micro-PDF 417, QR Code, and the like. Other encoding methods will be well known to those of skill in the art. Each encoding method offers different levels of convenience, data density, and error correction, but in all of the prior barcoding methods, the encoded data are recorded in a localized fashion, as in FIG. 7. If part of the barcode is corrupted by noise, damage, or blockage, the data may not be recoverable. For example, FIG. 8 shows the effect of Gaussian noise on the legibility of the data in FIG. 7. FIG. 9 shows the effect of occlusion on the data in FIG. 7.

Figure 10:
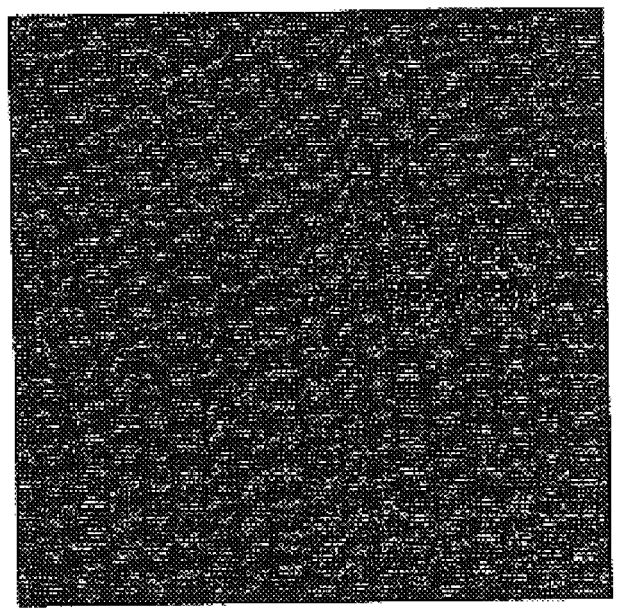
FIG. 10 shows the spatially encoded data in the bottom of FIG. 7.

The spread-spectrum modulation employed in this novel methodology mitigates the effects of occlusion and noise on the readability of the barcode by distributing the encoded data across the barcode rather than localizing it in glyphs. A simple approach to distributing the data is to first form a encoded data array A using a standard encoding method, and then to convolve A with a two-dimensional pseudo-random modulating kernel, $K_m$. For example, FIG. 10 shows the data "testing 1, 2, 3 . . . " as in the bottom of FIG. 7. This image is then convolved with the two-dimensional pseudo-random kernel shown in FIG. 11 and overlaid with a signature pattern and texture to obtain the barcode image in FIG. 12.

Demodulation of the barcode proceeds by convolving the image with a demodulation kernel, $K_d$. The kernels $K_m$ and $K_d$ are related to each other. If the modulation/demodulation (modem) scheme is conservative and therefore recovers data exactly in the absence of noise, $K_d$ is the inverse of $K_m$. Non-conservative modem schemes may provide more robust data recovery in the presence of noise and interference. A convenient implementation of such a scheme sets kernel $K_d$ to the transpose of $K_m$.

Figure 11:
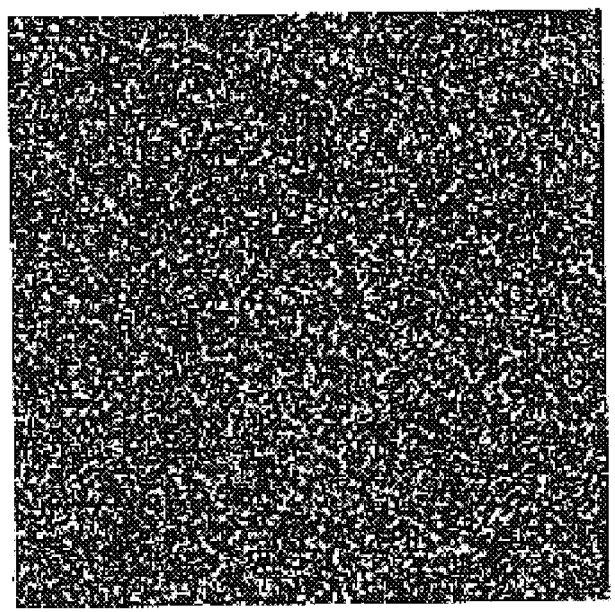
FIG. 11 illustrates a random number modulating kernel.
Figure 12:
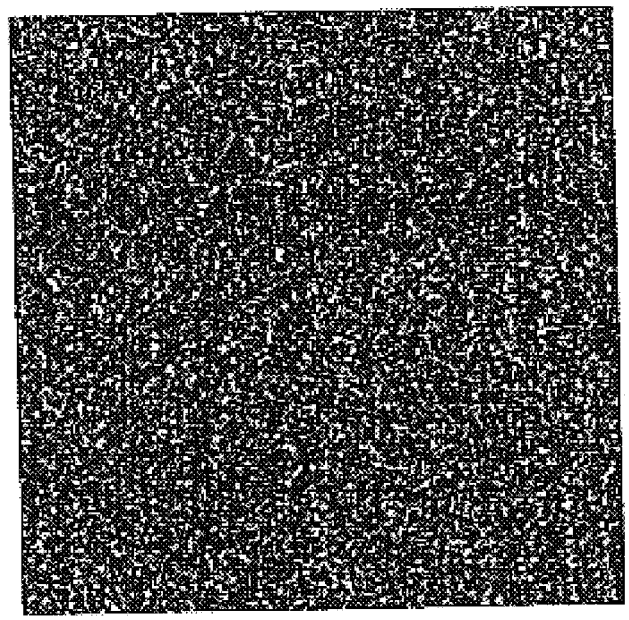
FIG. 12 illustrates the barcode obtained by convolving the data of FIG. 10 with the kernel of FIG. 11 and then superimposing signature array C.

The kernel shown in FIG. 11 is a "random-number" kernel, produced by first filling an array with numbers from a random number generator, then spatially filtering the array to reduce rapid variations in the grayscale, i.e., high-spatial frequencies. Each (complex) value in the spatial Fourier transform of a "random-number" kernel exhibits a random phase and a random amplitude. When noise and interference are present in the barcode image, random-number kernels perform worse than "random-phase" kernels, whose Fourier transforms have a random phase, but a deterministic variation in amplitude with spatial frequency (e.g., uniform). Spectral bands of the kernel having relatively low amplitude are de-emphasized in the barcode image. If the modem scheme is conservative, these bands are re-emphasized by demodulating with the kernel inverse, increasing the sensitivity to noise in these bands.

A random-phase kernel can provide optimal accuracy in the conservative recovery of data from noisy signals, as the spectral response can be tailored to emphasize a band in proportion to the expected noise spectrum of the band. On demodulation with the inverse of the kernel, the noise is optimally de-emphasized. If the noise spectrum is expected to be uniform or unknown and the data to be modulated has a uniform spectrum, an optimal conservative random-phase modulating kernel has a uniform spectral amplitude. The demodulation kernel (and inverse of the modulating kernel) is simply the transpose of the modulating kernel.

The modulation and demodulation scheme that most robustly recovers user data in the presence of noise and interference may be nonconservative. Thus, optimal pairs of modulating and demodulating kernels are not necessarily inverses of each other. Data encoded with both random-phase and random-number kernels may be nonconservatively demodulated by the use of demodulating kernels that are the transpose, but generally not the inverse of the modulating kernel. This procedure demonstrably improves the noise immunity of random-number-based modem schemes and may also improve random-phase-based modem schemes when specific interferences or noise is expected.

In one embodiment of the invention, encoded user data are modulated by cyclic convolutions (denoted by "∘") performed using the Fourier convolution theorem and fast Fourier transforms, such that modulation is accomplished by calculating $$E = K_m \circ A = FT^{-1}\{(FT\{K_m\})^* FT\{A\}\} \quad (4)$$

where E is the modulated data array, FT and $FT^{-1}$ are the Fourier transform and inverse Fourier transform operators, respectively, and * denotes complex conjugation. The barcode array B is then the sum of E and the product of a modulated signature array C and the "carrier ratio" coefficient γ, which represents the desired ratio of signature content to user data content. Thus, when the carrier ratio is 1, the user data content and signature content are equally represented in the resulting barcode array. When the carrier ratio is 0.25, the signature array represents only 25% of the content of the user data array in the barcode array. The choice of carrier ratio will vary with the intended use of the resulting barcode array. When the barcode must contain large quantities of user data, carrier ratios of approximately 0.0625 to approximately 1 may be used with a ratio ranging from approximately 0.1 to approximately 0.5 being preferred. In applications where the recovery of the signature array is paramount, as will be discussed below, carrier ratios ranging from approximately 1 to approximately 16 may be used, with carrier ratios ranging from approximately 2 to approximately 4 being preferred.

Figure 13:
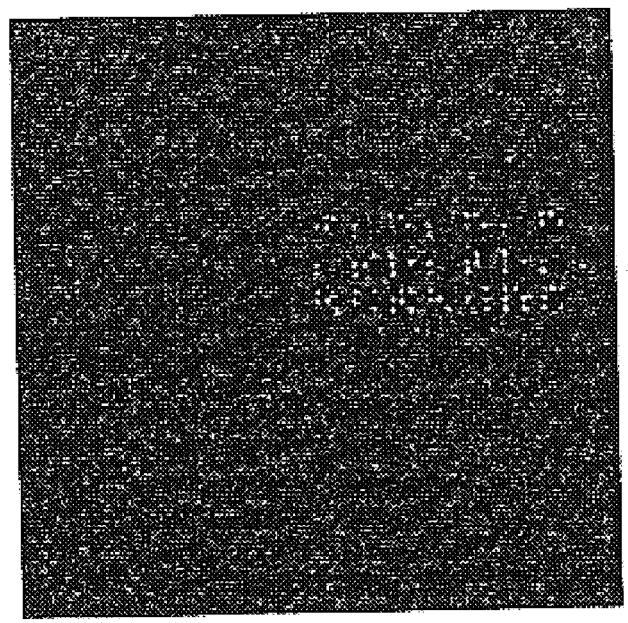
FIG. 13 presents data demodulated nonconservatively by convolving the barcode of FIG. 12 with the demodulating kernel $K_m^T$.

The encoded data array A may be recovered from a registered image of B via cyclic convolution with the demodulation kernel $K_d$. This process can be understood by noting that convolution is closely related to correlation. The convolution of two correlated random arrays contains peaks that scale linearly with the size of the array, N, which is the product of the number of rows and columns in the array. The peaks in the convolution of two uncorrelated random arrays scale with the square root of the size of the array. Thus the convolution of two uncorrelated arrays is subdominant to the convolution of two correlated arrays, provided the arrays are sufficiently large. Furthermore, the cyclic convolution of demodulating and modulating kernels approximates an identity by construction (or equals an identity if the modem scheme is conservative). The pseudo-random kernels $K_d$ and C are constructed to be uncorrelated, thus $$\|K_d o K_m\| \sim O(N), \|K_d o C\| \sim O(\sqrt{N}). \quad (5)$$

where the symbol O( ) denotes the order of the variation of the term.
Consequently, $$K_d o B = K_d o (K_m o A) + K_d o \gamma C \quad (6)$$

$$= (K_d o K_m) o A + \gamma K_d o C \quad (7)$$

$$\sim A \times O(N) + \gamma R \times O(\sqrt{N}) \quad (8)$$

$$\propto A, \text{ with } SNR \sim \gamma^{-1} O(\sqrt{N}) \quad (9)$$

where R is a random vector having unit norm. Thus the dominant component of the convolution of the pseudo-random demodulating kernel $K_d$ with the barcode array B is the encoded data array A. FIG. 13 shows the result of this operation using the data from FIGS. 10–12.

Figure 14:
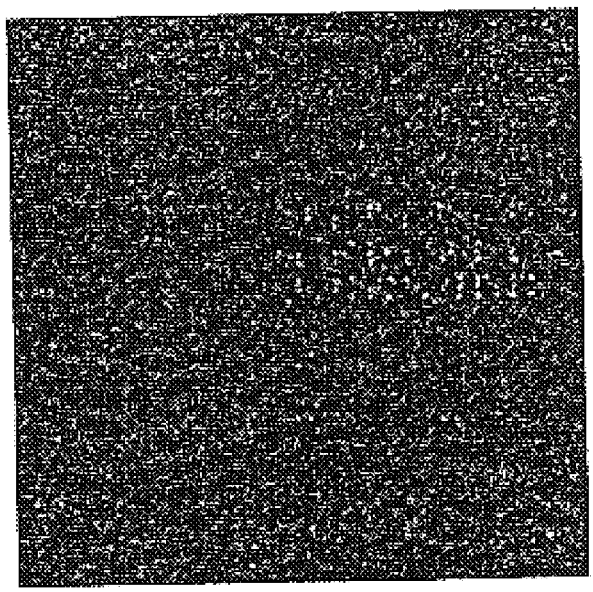
FIG. 14 presents demodulated data from a barcode with the same level of Gaussian noise as shown in FIG. 8.
Figure 15:
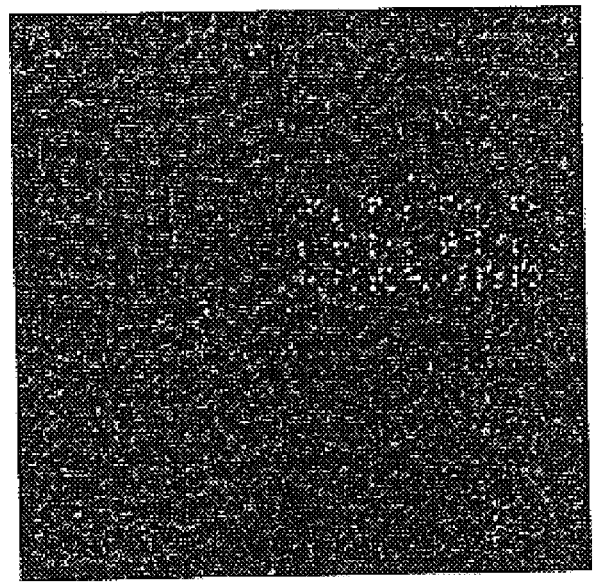
FIG. 15 presents demodulated data from a barcode with the same level of occlusion as shown in FIG. 9.

This methodology is relatively unaffected by incoherent noise, since the correlation peaks from noise are subdominant. FIG. 14 shows the demodulated data when the same noise level as in FIG. 8 is superimposed on the barcode data. This methodology is also relatively unaffected by occlusion of the barcode. FIG. 15 shows the demodulated data when half of the barcode image is blocked, as in FIG. 9. All the data encoded in the barcode are readable, but the SNR of the recovered data is reduced by a factor of ½.

Figure 16:
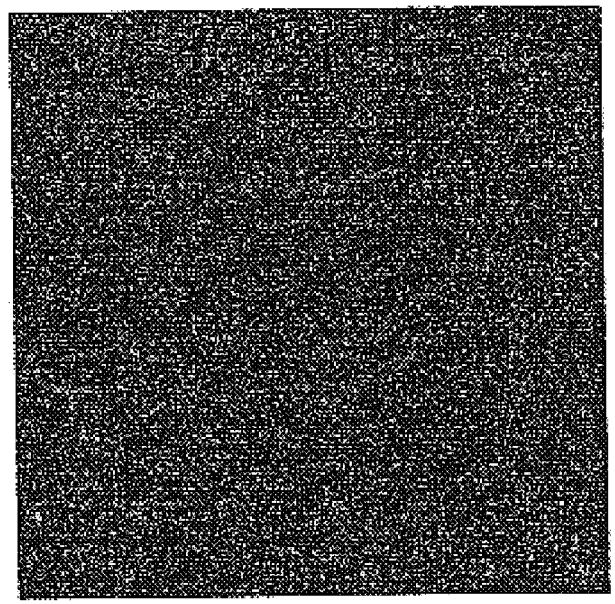
FIG. 16 is a uniform-amplitude, random-phase kernel used to modulate the data encoded as in FIG. 6.
Figure 17:
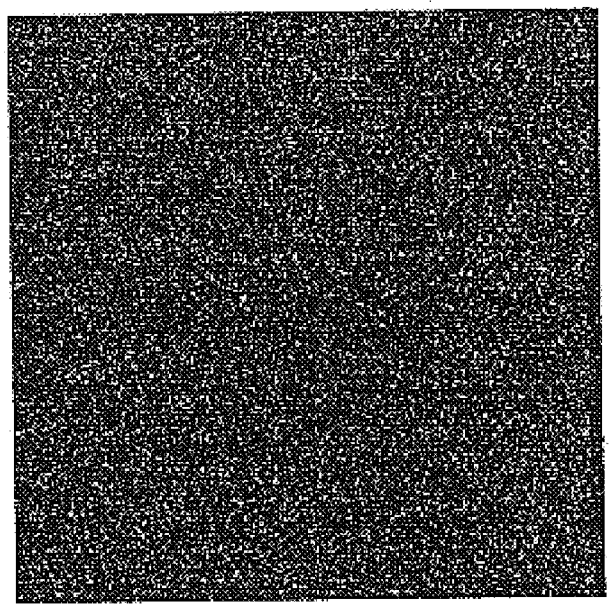
FIG. 17 shows the barcode achieved by modulating the data of FIG. 6 with the kernel of FIG. 16.
Figure 18:
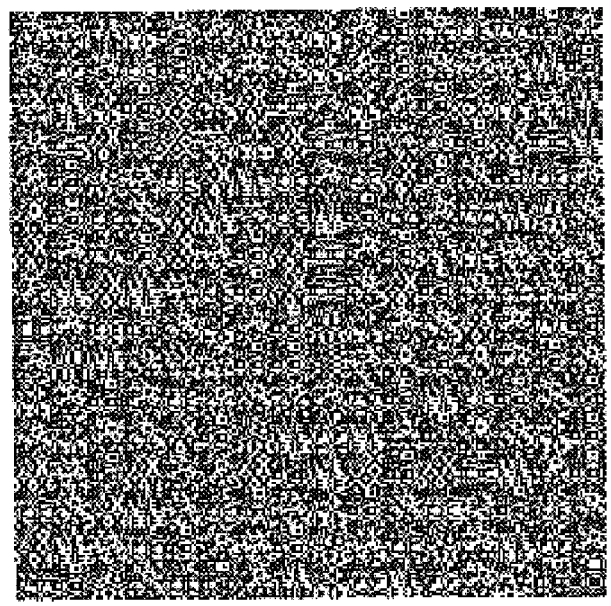
FIG. 18 shows the encoded demodulated data retrieved by demodulating the barcode of FIG. 17.
Figure 19:
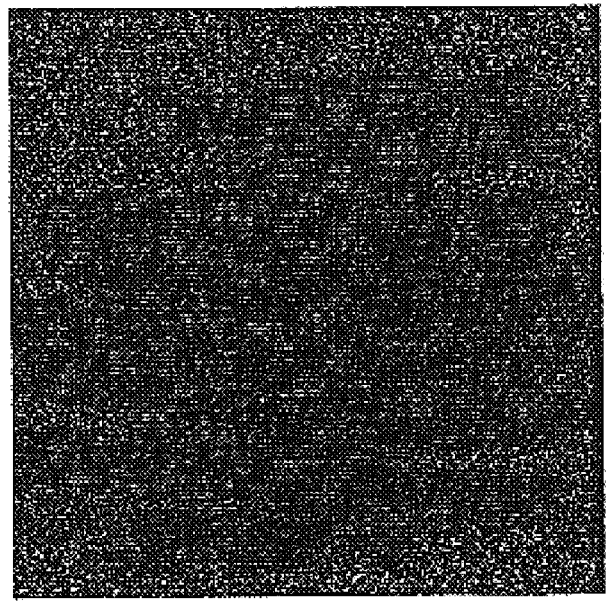
FIG. 19 shows the barcode of FIG. 17 with simulated occlusion blur and noise.
Figure 20:
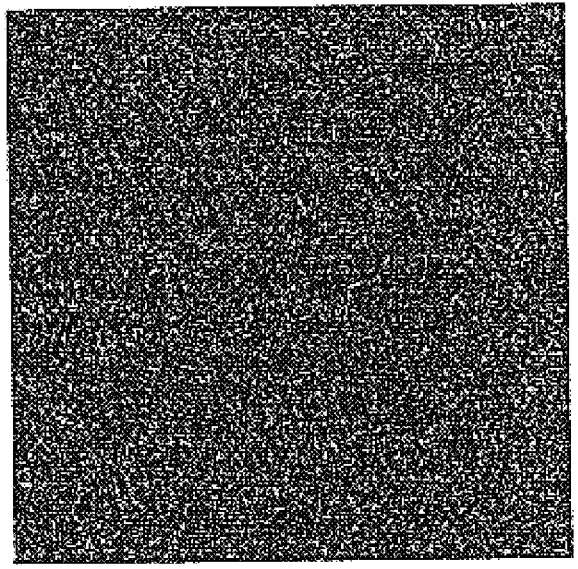
FIG. 20 shows the encoded demodulated data retrieved by demodulating the barcode of FIG. 19. All bytes of the quotation were decoded except one that was detected as erroneous.

FIGS. 16–20 depict the performance of a conservative modem scheme using a uniform-amplitude, random-phase kernel, as shown in FIG. 16. FIG. 17 shows the barcode obtained by modulating the encoded Gettysburg address data in FIG. 5 using the kernel of FIG. 16 and superimposing a signature pattern and texture at a carrier ratio ($\gamma$) of 0.25. The encoded data image demodulated from this barcode, shown in FIG. 18, has only slight imperfections arising from the superimposed signature. FIG. 19 shows a simulated damaged barcode with blur and additive noise. While the encoded data demodulated from this barcode, shown in FIG. 20, bear little resemblance to the relatively pristine data of FIG. 18, the analysis software successfully decoded all but a single character in which multiple bit errors were automatically detected. If the additive noise is removed, all characters are successfully demodulated.

Figure 21:
FIG. 21 shows the barcode of FIG. 12 with overlaid text and graphics.
Figure 22:
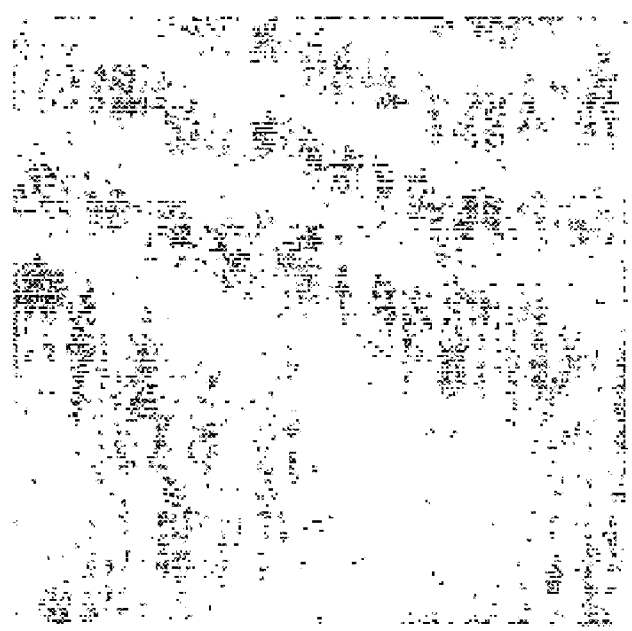
FIG. 22 shows the demodulated encoded data recovered from FIG. 20.
Figure 23:
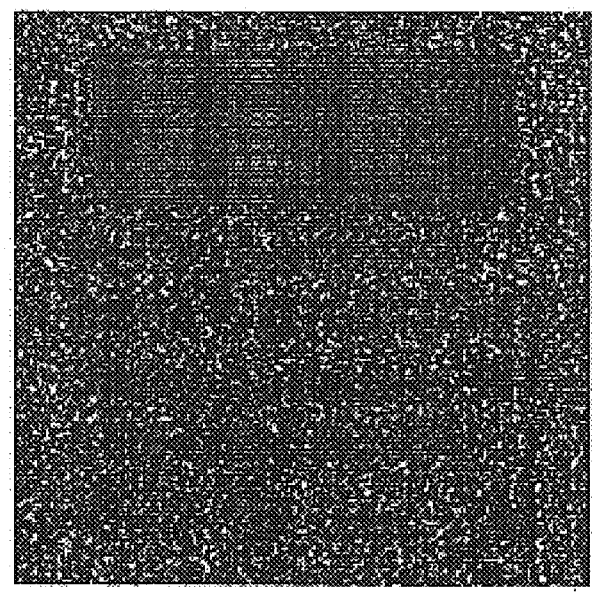
FIG. 23 illustrates the result of applying a simple thresholding algorithm to the overlaid barcode of FIG. 21.
Figure 24:
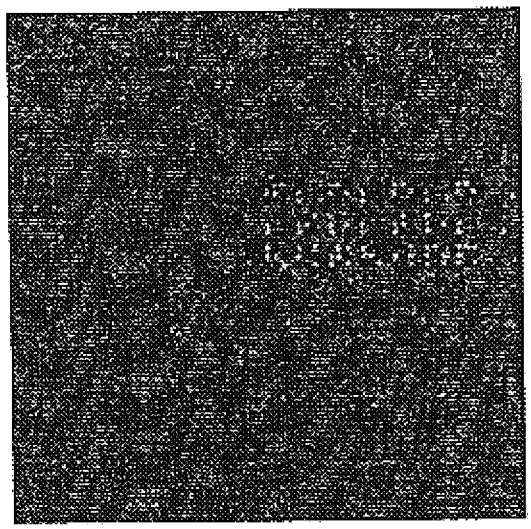
FIG. 24 shows the data demodulated from FIG. 23.

Conventional barcodes typically require a surrounding blank "quiet area" so the barcode can be identified. The spread-spectrum barcode requires no quiet area and can, in fact, be overprinted with text and graphics with little loss in SNR, provided that these overlays are distinct from the barcode and can be nulled from the image using thresholding, or similar, techniques. For example, FIG. 21 shows the barcode in FIG. 12 with overlaid text and graphics. FIG. 22 shows the barcode data recovered from this raw image. FIG. 23 shows the result of applying a simple thresholding algorithm to FIG. 21 that replaces the brightest 10% of pixels and the darkest 10% of pixels with the mean pixel value in the image. The data demodulated from the image in FIG. 23 are shown in FIG. 24. This simple thresholding procedure significantly enhances the SNR of the demodulated data. The ability to handle overprinting is unique to the spread-spectrum barcode and facilitates its use on product labels, postal envelopes, etc. The differentiation between the barcode and overprinted material can be by made using intensity, color, or (visual) texture and can be facilitated by color or spatial filters. The technique does not require perfect differentiation between the barcode and overprinted material, as even the barcode data in FIG. 22 are marginally readable, and there is no attempt in the processing to distinguish between the two.

If two incoherent modulation kernels $K_1$ and $K_2$ are used to modulate encoded data arrays $A_1$ and $A_2$, respectively, in the barcode, $$K_1 o B = K_1 o (K_1 o A_1) + K_1 o (K_2 o A_2) + K_1 o C \quad (10)$$

$$\sim A_1 \times O(N) + R \times O(\sqrt{N}) \quad (11)$$

$$\propto A, \text{ with } SNR \sim \sqrt{N} \quad (12)$$

Thus, multiple data sets may be multiplexed on the same barcode by the use of different uncorrelated modulation kernels. Demodulation of the barcode image with a given demodulation kernel recovers only the data modulated by the related modulation kernel. The SNR of the recovered data decreases as additional data are overlaid, so the amount of overlaid data is limited by the information capacity of the recorded image.

As discussed previously, image resolution can be facilitated by crafting the encoding scheme to produce barcodes having recognizable signature fiducial information, and/or by superimposing a signature array C in the form of a pseudo-random code having a recognizable signature texture, F. This section outlines methods with which to create an arbitrary desired signature as well as methods of using the signature to quantify local image distortions and as a tamper-indicating means.

Figure 25:
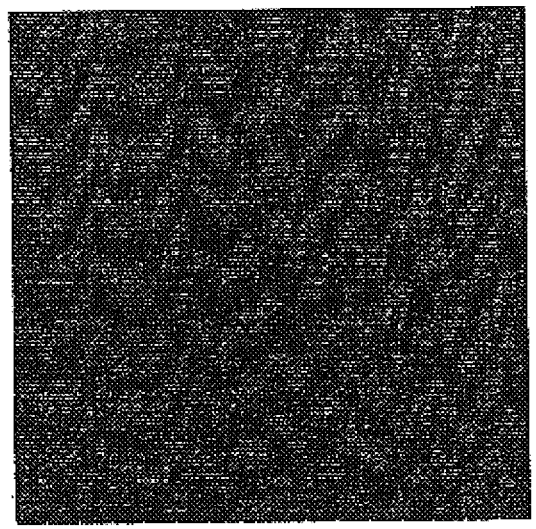
FIG. 25 is a sample of an easily recognizable ideal signature texture.

FIG. 25 shows a sample of an idealized signature texture. The dot distribution is distinctive and supports automated image analysis. An ideal texture array $C_I$ can be constructed having a precisely defined ideal signature texture $F_I$ everywhere except at the origin, provided $F_I$ is self-transposed, i.e., has symmetry through rotations of $\pi$. The ideal texture array $C_I$ is obtained by first taking the Fourier transform of the ideal signature texture, $IF_I FT\{F_I\}$. The resulting array $IF_I$ is purely real by symmetry. Next, a constant, b, is added to each element of $IF_I$ so the result everywhere is non-negative. The ideal array $C_I$ is then obtained by taking the inverse Fourier transform of the square root of the non-negative array:

$$C_I = FT^{-1}\left\{(IF_I + b)^{\frac{1}{2}}\right\} \quad (13)$$

This construction can be verified by autocorrelation of $C_I$, $$C_I o C_I = FT^{-1}\{(FT\{C_I\}) * FT\{C_I\}\} \quad (14)$$

$$= FT^{-1}\{IF_I + b\} \quad (15)$$

$$= F_I + b\delta \quad (16)$$

where $\delta$ is the Kronecker delta function of the array indices, i.e., unity at the origin and zero everywhere else. Because the Fourier transform of the signature texture is purely real by construction, the ideal texture array $C_I$ is a self-transpose, i.e., $C_I = C_I^T$, where the superscript T denotes transposition. The additive constant b produces a spike (Kronecker delta) at the origin of the autocorrelation. The relative magnitude of the Kronecker delta depends upon the details of the ideal signature texture, $F_I$.

The ideal texture array $C_I$ is not yet well suited for use with the spread-spectrum barcode as it may contain glyph-like structures that produce recognizable features. While such features may serve as the signature pattern for use in determining translational information or as tamper-indicating means, it is generally desirable to distribute the features across the barcode image. In order to distribute the ideal texture array, the same modulation procedure used to distribute the user data array can also be used, i.e., $$C = K_c o C_I \quad (17)$$

where $K_c$ is a self-transpose, pseudo-random kernel that is not related to any of the other data-encoding kernels. The signature texture of C can be shown to approximate $F_I$, i.e., $$CoC = (K_c o C_I) o (K_c o C_I) \quad (18)$$

$$= (C_I o K_c)^T o (K_c o C_I) \quad (19)$$

$$= C_I^T o (K_c^T o K_c) o C_I \quad (20)$$

$$\sim C_I^T o (\delta \times O(N) + R \times O(\sqrt{N})) o C_I \quad (21)$$

$$\sim C_I^T o C_I \times O(N) + R \times O(\sqrt{N}) \quad (22)$$

$$\propto F_I, \text{ with } SNR \ O\sqrt{N}, \quad (23)$$

where the self-transpose nature of both $K_c$ and $C_I$ has been used. If the kernel $K_c$ is not a self-transpose, only the self-transpose component of $K_c$, $([K_c^T + K_c]/2)$, contributes to the formation of the signature texture, which thus reduces the SNR of the texture demodulation.

Figure 26:
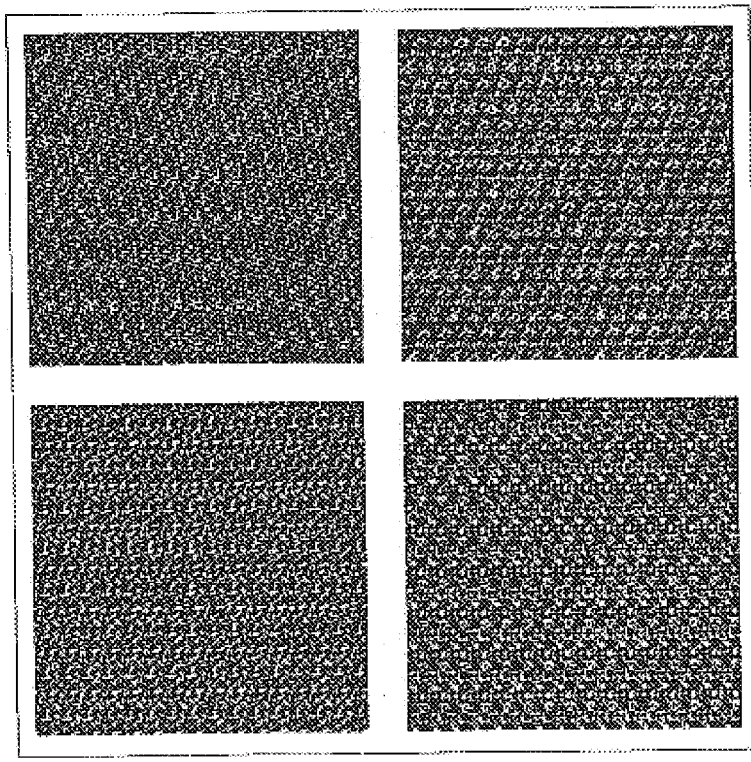
FIG. 26 shows four signature texture arrays having the ideal signature textures shown in FIG. 25.

FIG. 26 shows four signature arrays C whose textures approximate the ideal texture shown in FIG. 25. These carriers were produced by modulation $C_I$ with four different encoding kernels.

Figure 27:
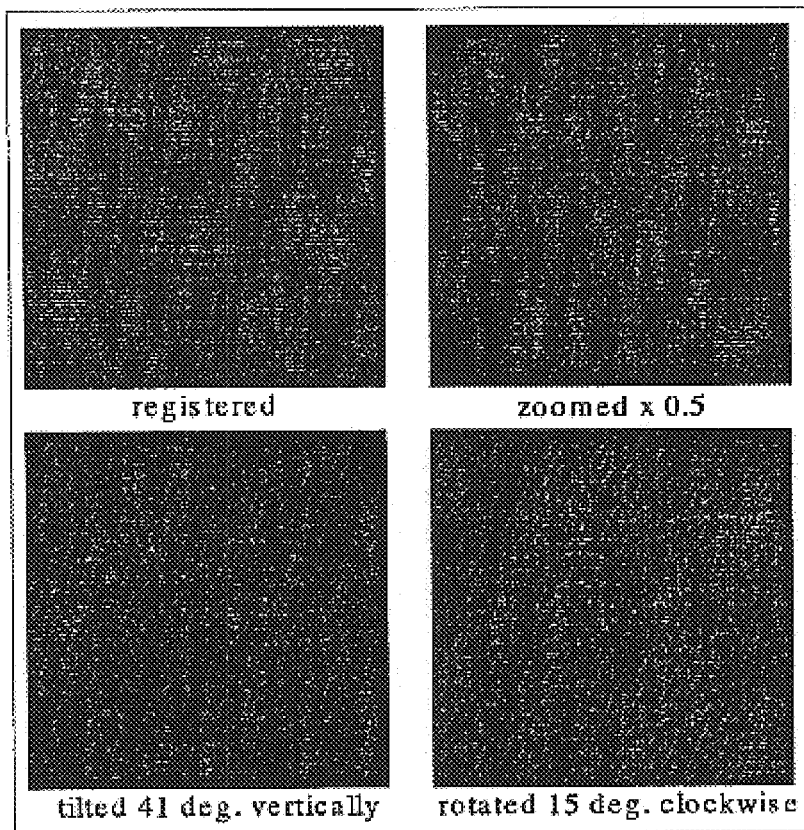
FIG. 27 shows the effects of various imaging distortions on the ideal signature texture.

As shown in FIG. 27, systematic distortions in the autocorrelation of the image from the ideal $F_I$ provide information about the zoom, tilt, perspective, and rotation of the barcode needed for registering the image. By examining distortions in the texture obtained from different regions of the image, barcode curvature and higher-order distortions can be inferred. This information about the shape of the surface bearing the barcode also has utility in other applications, such as mapping the surface contours or topography of an object or detecting distortions or damage to a deformable substrate, thereby indicating that tampering with the barcode and/or object has occurred. In one embodiment, the spread-spectrum barcode contains encoded modulated data and provides an indication that the barcode has been broken or damaged. In such applications, carrier ratios greater than unity may be used so as to facilitate the retrieval of surface distortion information.

It should be noted that the textures in FIG. 27 are not identical to the ideal texture in FIG. 25. The variation in the textures is due to the presence of encoded user data in the barcode. The sum of the textures of any multiplexed encoded data is superimposed on the texture. The texture of the modulated user data array is characteristic of the specific data and the data-encoding technique and is not initially known to the barcode reader. It is, however, known to the barcode writer and can be compensated for in the selection of $F_I$. That is, $F_I$ can be replaced by $F_I$–EE, the difference of the desired texture and the texture of the data portion of the barcode. This additional procedure masks the texture of the stored data. The data texture may be used to check whether the encoded data is consistent with a given data set and is therefore a data security limitation. Thus, this masking procedure provides additional data privacy at the cost of reduced data capacity.

The relative translation of the scanned barcode image with respect to the registered barcode image is obtained by comparing corrected subimages of the barcode containing recognizable features with a signature pattern that is known by the barcode scanner. For example, the glyph-like structures in the ideal signature array that produce recognizable features, which were discussed above, may be compared to a known signature pattern. Alternatively, the recognizable subimages may be a function of the data encoding process itself. The comparison of the subimages can be conveniently automated by cross-correlations of the subimages with the known signature pattern. If required, the resulting position information can be used to improve the image registration iteratively.

The spread-spectrum barcode of the invention can be realized by a variety of means. In all cases the data and the fiduciary are "spread" over the entire barcode image. The barcode may be "printed" by any of the standard means of production, including laser, inkjet, offset, relief, etc. printing. The printing of the barcode can be "real-time" from a portable device or it can be preprocessed into an identical set or sequential series. Other means of reproduction, including embossing, photography, and the like are also amenable to the realization of the barcode.

The inks may represent any of the broad spectrum of commercial and proprietary inks, as well as new formulations intended to augment the barcodes utility. Special aspects of the inks, i.e. water solubility, low melting point, fluorescence, etc., may be used to broaden the applicability of the barcode scheme and, as discussed above, the ink may also contain particles that act as particulate tamper-indicating means.

III. Method of Detecting Tampering Using the Tamper-Indicating Barcode

The tamper-indicating barcodes of the invention can be used to detect tampering according to the following method. As an initial step, the various relevant characteristics of the tamper-indicating means are determined for future reference. These pre-determined characteristics are then used as a basis for comparison. The actual characteristics to be referenced will vary dependent on the type of tamper-indicating means utilized. If, for example, a particulate indicator is used, the locations of the individual particles are initially determined and their positions made note of. Suitable detectors will be readily apparent to those of skill in the art and the choice of detector will, of course, be dependent upon the type of particle or particles utilized. The same detectors can be used to initially ascertain the pre-determined characteristics, as well as being used to ascertain whether the barcode has been tampered with.

If optical indicators are used, the optical properties of the image or barcode are initially determined. This may be accomplished using conventional imaging devices and techniques. Determination of the optical properties may involve recording the image of the barcode when viewed from different angles and may also involve the recording of the position of optical indicators that cover only a potion of the barcode component, e.g., as dots or discrete areas of refractive, optically active, or other similar materials.

In embodiments where a deformable substrate is used with a non-spread-spectrum barcode, the relevant pre-determined characteristic may involve simple recognition of the structural integrity of the deformable substrate. When a spread-spectrum barcode component is used in conjunction with a deformable substrate, the relevant characteristic to be referenced may be a signature pattern or texture encoded within the barcode component.

Once the characteristics of interest have been determined for future reference, the substrate upon which the barcode is attached is allowed to circulate according to its customary usage, e.g., storage, transport, etc. After an intervening period of time, the barcode is examined to ascertain the current characteristics of the tamper-indicating means. Examination of the tamper-indicating means is carried out as discussed above with respect to the initial determination of the reference characteristics. A comparison is then made of the reference and current characteristics and the determination of tampering is made.

The tamper-indicating barcode is useful in the labeling and identification of any number of products and substrates. The level of tamper indicating can be tailored to the item of interest and balancing the cost associated with the tamper indicating elements. For high-throughput, low value items a deformable substrate would be used since it is the most inexpensive option contained herein. The refractive coating would be the next level of added security with a moderate cost, followed by particle containing inks and adhesives. The highest level of security is found in the particle containing gel pouches but would also incur the highest monetary cost. Examples of where this high cost may be tolerated are pharmaceutical shipping and high-value commodities shipping (i.e., gold and diamonds). In addition, any number of these tamper indicating elements may be used individually or as a combination of elements in order to satisfy the desired level of security.

It is to be understood that while the invention has been described in conjunction with the preferred specific embodiments thereof, the foregoing description is intended to illustrate and not limit the scope of the invention. Other aspects, advantages, and modifications will be apparent to those skilled in the art to which the invention pertains. All patents, patent applications, journal articles, and other references cited herein are incorporated by reference in their entireties.

EXAMPLES

Example 1

Deformable Substrate

A spread spectrum barcode containing a fiducial signature pattern is printed onto a cellulose acetate deformable substrate and then affixed to the surface of a container. The deformable substrate is then peeled from the surface of the container resulting in deformation to the cellulose acetate substrate. The barcode is then reaffixed to the surface of the container to avoid the detection of obvious tampering. The reaffixed barcode is scanned and changes to the fiducial signature induced by the damage incurred to the deformable substrate during removal are detected, thereby indicating that the barcode has been tampered with.

Example 2

Particle Containing Coating/Refractive Covering

Phosphorescent particles are placed in a film coating material by direct application of the particles to a liquid coating. The particle containing coating are then applied to the printed surface of the barcode and allowed to harden. After the coating has fully hardened, the phosphorescent nature of the particles is observed by illuminating them with a 980 nm diode laser. The barcode is successfully translated through this particle containing coating.

In addition to particle containing coatings, refractive films such as holograms and diffractive patterns, whether in sheet form, printed relief, or embossed texture, may also be used as a covering that is placed on the barcode. Numerous combinations of optic elements and/or compatible coatings can be placed on the barcode to serve as a tamper-indicating element deduced by the embedded spread spectrum fiducial.

Example 3

Particles in the Ink/Adhesive

Particle-containing ink was injected into an emptied ink cartridge of an Epson C80 Inkjet Printer. The particle-containing ink is comprised of a standard inkjet ink, phosphor particles having a diameter smaller than the nozzle of the Epson printer, and any necessary surface treatments or surfactants. A barcode is then printed utilizing these particle-containing inks. The printed phosphor particles are observed by exposure to a 980 nm light and the location of the particles recorded for future reference. Any movement of the particles from their initial position is detectable by comparison with the recorded initial position.

Example 4

Gel Pouch Containing Particulate Indicators

A particulate indicator comprised of a hydrogel made up of the nonionic surfactant Pluronic® F127, manufactured by BASF, and water was fabricated. The surfactant is a copolymer blend of polyethylene and polypropylene oxide. It is highly soluble in water, and forms a gel at 10 wt % surfactant and higher at 23° C. A 30 wt % system was used, having a glass transition state of 4° C. The proper amount of Pluronic® F127 was first dissolved in deionized water at 2° C. utilizing sonication until a completely clear and isotropic solution was obtained. Sub-millimeter opaque polycarbonate particles, phosphor particles, and ultraviolet latex particles were then placed in different cooled liquid solution containers so that only one type of particle was contained therein. The solution was then mixed thoroughly by hand and aliquots were poured into 7.5 cm×7.5 cm square polyethylene pouches contained in a gel casting system. This gel casting process ensured uniform thickness over the length of the gel and a random distribution of the particles. The cast systems were then allowed to gelate at room temperature.

Figure 28A:
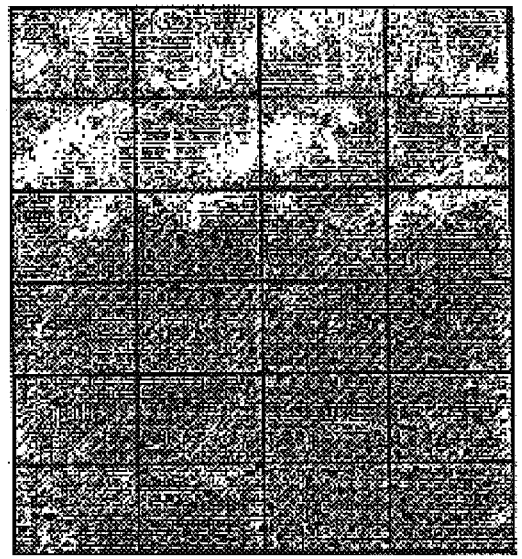
FIGS. 28A and B show a tamper-indicating barcode of the invention as prepared in Example 4.

They were then sealed using a heat sealer and stored in a vertical position at room temperature. The resulting barcode is shown in FIG. 28A.

Figure 28B:
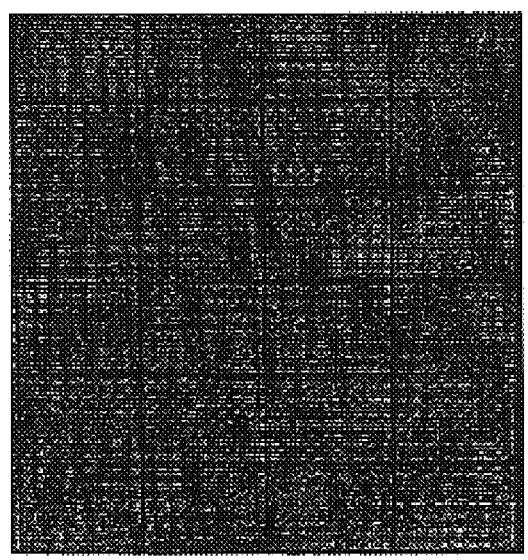

An aging study was then constructed to observe the effect of gravity on the position of the suspended particles. Over the course of six months at room temperature, none of the observed systems exhibited appreciable non-uniform particle movement. No phase change was observed in any of the samples, demonstrating that the systems did not change with the absorption of water through the polyethylene pouches. The barcode after the six-month aging process is shown in FIG. 28B. Barcodes were successfully translated at several particle loading levels. Tampering was successfully detected when the particles were disturbed. This detection was successful down to fractions of particle diameter movement and/or to the individual pixel resolution as dictated by the user choice of imaging devise.

We claim:

1. A tamper-indicating barcode comprising a barcode component having at least one tamper-indicating means attached thereto, wherein the barcode component is a pixel-based spread-spectrum barcode and the tamper-indicating means has pre-determined characteristics, and further wherein user data is modulated in a distributed fashion across a data bearing barcode image so that each pixel of image, on average, contains an equal fraction of all the encoded information.

2. The barcode of claim 1, wherein the tamper-indicating means is selected from the group consisting of particulate indicators, deformable substrates, optical indicators, and combinations thereof.

3. The barcode of claim 2, wherein the tamper-indicating means is a particulate indicator.

4. The barcode of claim 3, wherein the particulate indicator is printed with the barcode component.

5. The barcode of claim 2, wherein the particulate indicator is a particulate containing gel.

6. The barcode of claim 2, wherein the particulate indicator is a particulate containing pressure adhesive used to attach the barcode to a desired substrate.

7. The barcode of claim 2, wherein the tamper-indicating means comprises more than one particulate indicator.

8. The barcode of claim 1, wherein the tamper-indicating means is a deformable substrate, and the barcode component is printed thereon.

9. The barcode of claim 6, wherein the deformable substrate is selected from the group consisting of polymeric materials, cellulosic materials, metallic materials, and combinations thereof.

10. The barcode of claim 1, wherein the tamper-indicating means comprises an optical indicator that is attached to a visible surface of the barcode component.

11. The barcode of claim 10, wherein the optical indicator is selected from the group consisting of holographic materials, prismatic materials, geometric materials, refractive materials, polarizing materials, and combinations thereof.

12. The barcode of claim 1, wherein the tamper-indicating means comprises a particulate indicator and an optical indicator.

13. The barcode of claim 12, wherein the tamper-indicating means further comprises a deformable substrate.

14. The barcode of claim 1, wherein the barcode component is produced by the steps of:
    a. encoding a set of user data to form an encoded user data array;
    b. modulating the user data array using a pseudo-random kernel $K_m$, to form a modulated data array;
    c. formatting the modulated data array to produce a pixel-based barcode array; and
    d. transferring the barcode array onto a portion of a recording medium, wherein the transferred user data are distributed evenly across said portion of the recording medium.

15. The barcode of claim 14, wherein the user data are encoded so that the user data array additionally comprises a fiducial signature that acts as the tamper-indicating means.

16. The barcode of claim 15, wherein the fiducial signature comprises a recognizable signature texture and a signature pattern.

17. The barcode of claim 14, the method further comprising step (e) superimposing onto the barcode array a signature array.

18. The barcode of claim 17, wherein in step (a), the user data are encoded so as to have a signature texture incorporated therein and the signature array contains a signature pattern bitmap modulated using a two-dimensional pseudo-random kernel $K_c$.

19. The barcode of claim 18, wherein the two-dimensional kernels $K_m$ and $K_c$ are the same.

20. The barcode of claim 17, wherein the signature array comprises a signature texture array modulated using pseudo-random kernel $K_c$.

21. The barcode of claim 20, wherein in step (a) the user data are encoded so as to have a signature pattern incorporated therein.

22. The barcode of claim 21, wherein pseudo-random kernels $K_c$ and $K_m$ are the same.

23. The barcode of claim 14, further comprising in combination with step (c) formatting and superimposing onto the modulated data array at least one additional modulated data arrays, wherein each additional modulated data array is produced by modulating an additional user data array with an additional pseudo-random kernel, $K^i_m$, where i is the number of the additional array, and the barcode array is produced by the superimposition of the additional modulated data arrays onto the modulated data array formed in step (b).

24. A method for ascertaining if a pixel-based spread-spectrum barcode has been tampered with comprising the steps of:
    a. providing a tamper-indicating barcode comprising a pixel-based barcode component having at least one tamper-indicating means attached thereto, wherein the tamper-indicating means has pre-determined characteristics, and wherein user data is modulated in a distributed fashion across a data bearing barcode image so that each pixel of image, on average, contains an equal fraction of all the encoded information;
    b. examining the barcode to determine the current characteristics of the tamper-indicating means; and
    c. comparing the current characteristics with the reference characteristics to ascertain if the barcode has been tampered with.

25. The method of claim 24, wherein the tamper-indicating means is selected from the group consisting of particulate indicators, deformable substrates, optical indicators, and combinations thereof.

26. The method of claim 25, wherein the tamper-indicating means comprises a particulate indicator and the predetermined and current characteristics comprise the location of particles.

27. The method of claim 26, wherein the tamper-indicating means comprises a deformable substrate upon which the barcode component is printed and the predetermined and current characteristics comprise the physical condition of the deformable substrate.

28. The method of claim 25, wherein the tamper-indicating means comprises an optical indicator that is affixed to a visible portion of the barcode component and the predetermined and current characteristics comprise the optical properties of an image viewed through the optical indicator.

* * * * *